United States Patent [19]

Waugh

[11] 4,011,766
[45] Mar. 15, 1977

[54] ENDLESS POWER TRANSMISSION BELT
[75] Inventor: Dale L. Waugh, Springfield, Mo.
[73] Assignee: Dayco Corporation, Dayton, Ohio
[22] Filed: Feb. 19, 1976
[21] Appl. No.: 659,312
[52] U.S. Cl. .................................. 74/234; 74/237
[51] Int. Cl.$^2$ .................... F16G 5/00; F16G 1/22; F16G 5/10
[58] Field of Search ........................... 74/234, 237
[56] References Cited
UNITED STATES PATENTS

| | | | |
|---|---|---|---|
| 3,626,775 | 12/1971 | Gentry | 74/234 X |
| 3,836,605 | 10/1974 | Müller | 74/234 |
| 3,948,113 | 4/1976 | Stork | 74/234 |

Primary Examiner—Leonard H. Gerin
Attorney, Agent, or Firm—Reuben Wolk

[57] ABSTRACT

An endless power transmission belt made primarily of elastomeric materials is provided and comprises a plurality of laterally spaced belt elements which are interconnected by a tie band with the belt elements each having a tension section, a load-carrying section, and a compression section and each of the elements has a plurality of teeth defined in its compression section with the teeth in each belt element being staggered relative to teeth in an immediately adjacent belt element.

20 Claims, 10 Drawing Figures

ENDLESS POWER TRANSMISSION BELT

BACKGROUND OF THE INVENTION

There are numerous applications of elastomeric endless power transmission belts throughout industry where the load to be driven, operating conditions, and other considerations dictate the use of a wide belt having a plurality of spaced ribs which engage associated pulley grooves. A typical wide belt with such ribs is shown in U.S. Pat. No. 2,802,511. However, it will be seen that in a belt of the type disclosed in the abovementioned patent the load-carrying section and the tension section of such belt are each made as a single unit or uniform thickness structure at each point or location across the width of the entire belt whereby this type of belt has a substantial thickness which results in the belt being very stiff.

It has also been proposed to provide so-called banded belts to obtain required belt width but some of these belts tend to whip and vibrate when operated under high loads and such belts are also not very flexible.

Belt flexibility has been provided in some single element belts by forming teeth in the compression section of such belts; however, a single element toothed belt cannot drive comparatively high loads and is noisy when operated in associated sheaves.

SUMMARY

It is a feature of this invention to provide an elastomeric endless power transmission belt for operation in an endless path with such belt being capable of operating under substantial loads yet with optimum flexibility.

Another feature of this invention is the provision of a belt of the character mentioned which operates comparatively quietly in associated sheaves.

Another feature of this invention is the provision of an endless power transmission belt for operation in an endless path and which comprises a plurality of laterally spaced belt elements and a tie band interconnecting the belt elements with each of the belt elements being, in essence, self-contained and comprising a tension section, a load-carrying section, and a compression section and each of the elements having a plurality of teeth defined in its compression section. The teeth in each belt element are staggered relative to the teeth of an immediately adjacent belt element and the teeth provide optimum flexibility for the belt characterized by a substantially uniform bending modulus and the staggered relation of the teeth assuring the belt is free of hinge points and also assuring quieter operation thereof in associated sheaves.

Accordingly, it is an object of this invention to provide an endless power transmission belt having one or more of the novel features set forth above, or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
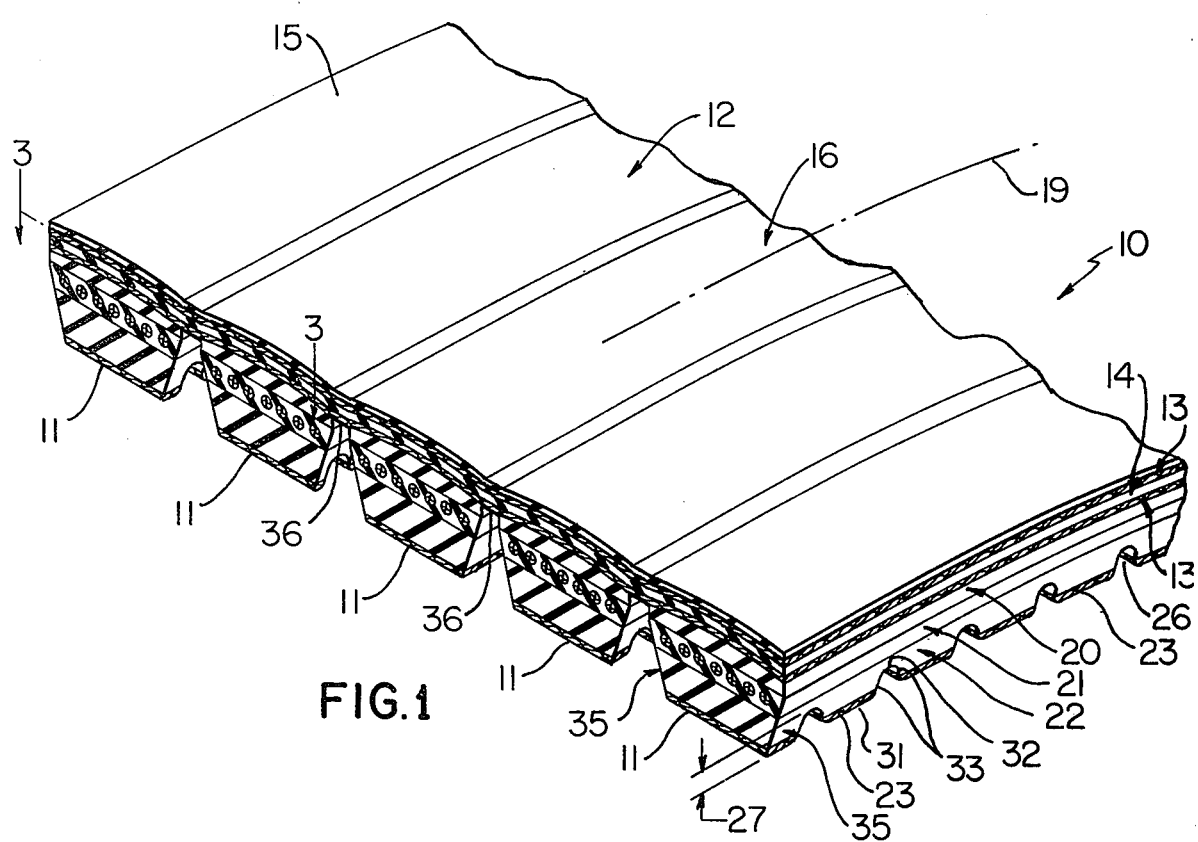
FIG. 1 is a perspective view with parts in cross section, parts in elevation, and parts broken away illustrating one exemplary embodiment of the belt of this invention.

Referring now to FIG. 1 of the drawings, it will be seen that one exemplary embodiment of a so-called banded endless power transmission belt of this invention is provided and designated generally by the reference numeral 10. The belt 10 is made primarily of elastomeric material and comprises a plurality of laterally spaced belt elements, shown in this example as a plurality of five belt elements, each designated by the same reference numeral 11 and a tie band 12 is provided tying the belt elements together in a high strength manner.

The tie band 12 of this example comprises a plurality of cooperating layers shown as an inner fabric layer 13 and an outer fabric layer also designated by the reference numeral 13. The fabric layers 13 have an elastomeric matrix layer 14 disposed and bonded therebetween in sandwiched relation and an elastomeric (rubber in this example) layer 15 defines the outside or top surface of the belt 10.

Figure 3:
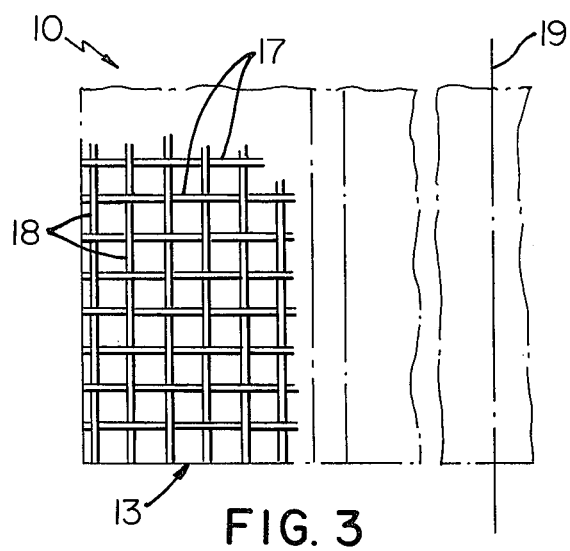
FIG. 3 is a fragmentary view taken essentially on the line 3—3 of FIG. 1 particularly illustrating threads of the top layer of woven fabric layers used in the tie band of the belt of FIG. 1 wherein the warp threads are disposed perpendicular to the endless path of the belt and the weft threads are disposed parallel thereto.

Each of the fabric layers 13 of this example is made of a square woven fabric material; and, as seen in FIG. 3, the woven fabric material has warp threads or warps 17 and weft threads or wefts 18 with the warps 17 of this example being disposed perpendicular the endless path 19 of belt 10 and hence perpendicular the longitudinal axis 19 of such belt and the wefts 18 being disposed parallel the endless path 19.

The laterally spaced belt elements 11 of the belt 10 are self-contained elements as mentioned earlier and will now be described in detail and such self-contained elements are banded together by the tie band 12. In particular, each of the elements 11 comprises a tension section 20, a load-carrying section 21, and a compression section 22 and each of the elements has a plurality of teeth each designated by the same reference numeral 23 defined in its compression section with a representative few of such teeth being thus designated.

Figure 2:
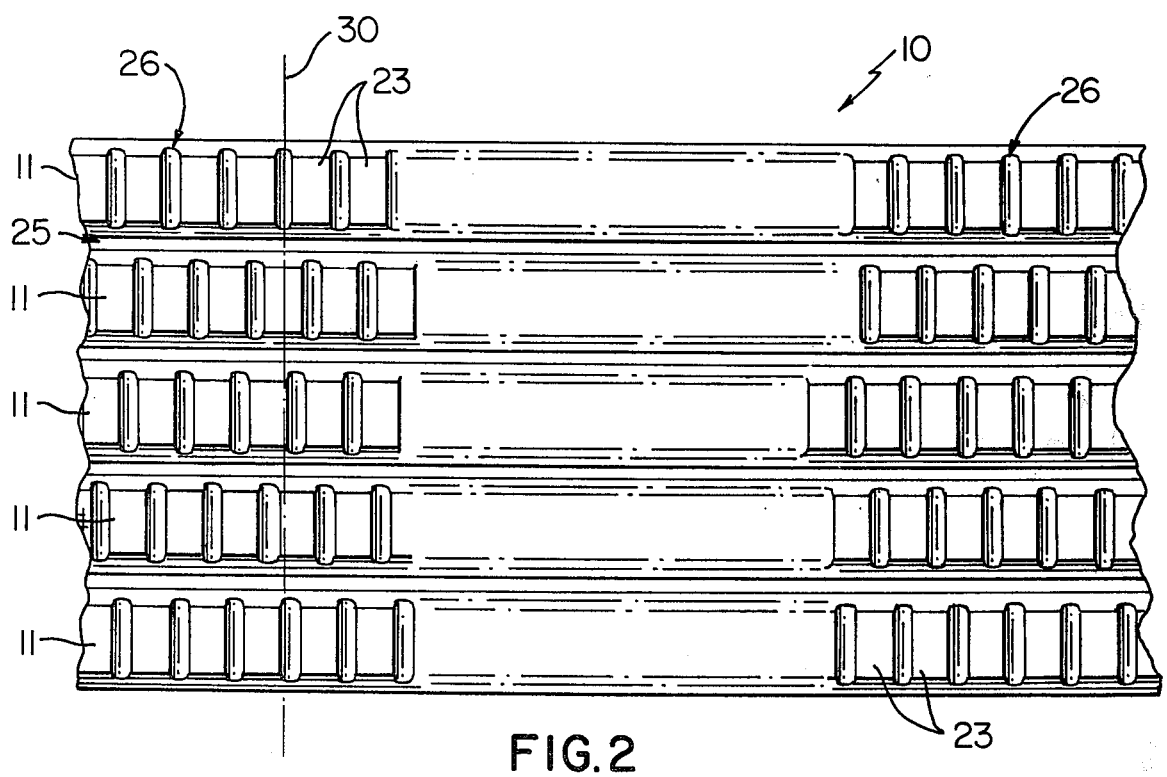
FIG. 2 is a view looking perpendicularly toward the inside surface or bottom of a straight section of the belt of FIG. 1.

The teeth 23 of belt 10 are of substantially equal size and the teeth in each belt element 11 are staggered relative to the teeth of an immediately adjacent belt element and as illustrated at a typical location 25 in FIG. 2. The staggered teeth 23 provide optimum flexibility for the belt with such flexibility being characterized by a substantially uniform bending modulus.

The equal size teeth 23 in each element 11 are defined by a plurality of equal size grooves extending perpendicular the endless path 19 with the grooves each being designated by the same reference numeral 26 and only a few representative ones of such grooves being thus designated. The transverse grooves 26 extend into the compression section 22 of each belt element for a fractional part of the thickness of the compression section as illustrated at 27.

The grooves 26 and teeth 23 of the belt 10 are of substantially equal size as explained earlier and the grooves and teeth in one element 11 are off-set from the grooves and teeth of an adjacent element 11 within a pre-established range. Accordingly, the grooves 26 of a particular element 11 are off-set from the grooves of an immediately adjacent element within the range of one fourth to three fourths (¼ – ¾) of the pitch of the teeth 23 in each element 11. To illustrate the manner in which such grooves 26 and teeth 23 are offset it will be seen that a straight dot-dash line 30 is provided in FIG. 2 so that it extends across the five belt elements 11 perpendicular to the endless path 19. The offset position of each groove 26 and tooth 23 in each belt element 11 relative to the line 30 and thus relative to the grooves 26 and teeth 23 of other elements may be readily observed.

The staggered relation of the equal size teeth assures that the belt 10 is free of hinge points or lines of the type that would be provided if such teeth were not to be staggered. For example, if the equal size teeth 23 were not staggered and were to be in transverse alignment between elements 11, the substantially equal size grooves 26 would also extend in a straight line across the belt 10 whereby a reduced thickness hinge line would be provided across the entire belt 10 at each set of aligned grooves which would weaken the belt.

The staggered relation of the teeth 23 assures quieter operation of the belt 10 in associated sheaves. This quieter operation is assured because the same point on all teeth of a particular belt 10 and hence all grooves do not move away from an associated sheave at the same time. This staggered arrangement of the teeth eliminates what has often been referred to as a "siren effect" which is common in a single element toothed belt due to the repeated manner in which the teeth and grooves leave each sheave.

The exemplary belt 10 has a fabric layer 31 defining the crest of each tooth 23 and the grooves 26 defined in each belt element are free of covers whereby such grooves are what is often referred to in the art as being raw edged. Each of the grooves 26 has a substantially semi-cylindrical base portion 32 adjoined by straight sides 33 with the base portion and straight sides being free of covers.

As previously mentioned the entire belt 10 is preferably made primarily of elastomeric material and each of the belt elements has a substantially trapezoidal cross-sectional configuration defined by non-parallel sides each of which is designated by the same reference 35. Further, it will be seen that the non-parallel sides 35 of each belt element 11 are free of covers and are also so-called raw edged sides.

The tie band 12 is comprised of a plurality of two fabric layers shown in the exemplary belt 10 as woven fabric layers 13 and it will be seen that the tie band 12 binds the elements 11 together by binding each element adjacent the tension section 20 thereof to assure that the tie band 12 is adhered or bonded to the tension sections 20 of the elements 11, a layer 36 of elastomeric material which is compatible with the material of the tension sections 20 is provided on the bottom surface (as viewed in FIG. 1) of the bottom fabric layer 13. The layer 36 may be comparatively thick; however, in this example such layer is shown as a thin rubber layer which may be applied by frictioning, skim coating, calendering or other well known process.

Figure 5:
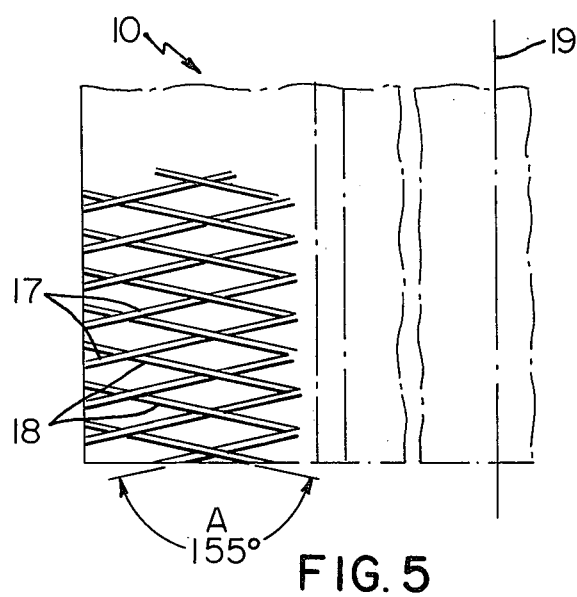
FIG. 5 is a view similar to FIG. 3 illustrating another modification of the belt of FIG. 1 which utilizes two woven fabric layers in the form of so-called stress-relieved fabric wherein the warp threads and weft threads are disposed at an obtuse angle to each other which in this example is shown at an angle of roughly 155° and such angle is in essence bisected by imaginary lines parallel to the longitudinal axis of the endless belt.
Figure 4:
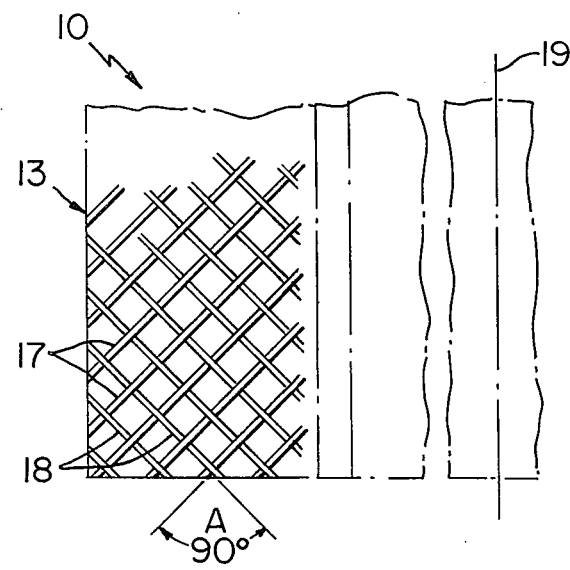
FIG. 4 is a view similar to FIG. 3 illustrating a modification of the belt of FIG. 1 wherein the fabric layers therein employ so-called bias cut woven fabric having warp threads and weft threads disposed at 90° with each other yet such warp and weft threads are each disposed at an angle of 45° with the longitudinal axis of the endless belt.
Figure 6:
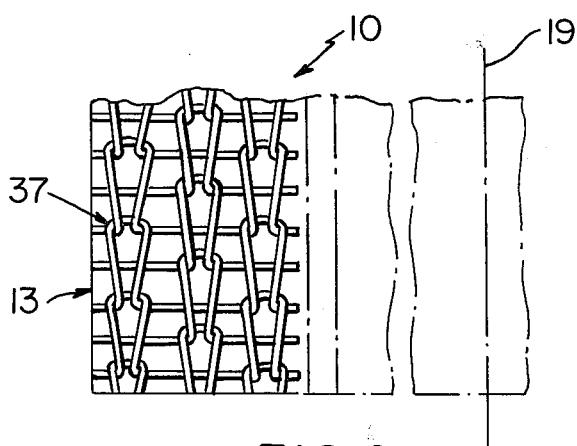
FIG. 6 is a view similar to FIG. 3 illustrating another modification of the belt of FIG. 1 wherein the fabric layers are in the form of knitted fabric layers.

Reference is now made to FIGS. 4, 5, and 6 of the drawings which illustrate modifications of the belt of the invention. The modified belts illustrated in FIGS. 4, 5, and 6 are substantially identical to the belt 10 with the exception that the fabric layers provided in the tie band 12 are different. In particular instead of each fabric layer being made of square woven fabric having warps 17 disposed perpendicular to the longitudinal axis 19 and wefts 18 disposed parallel thereto the belts of FIGS. 4, 5, and 6 are made with at least one fabric layer of the tie band and preferably both layers thereof having the warps and wefts at other angles or made of knitted threads as will now be described.

The modified belt 10 of FIG. 4 utilizes two bias cut or laid fabric layers 13 wherein the warps 17 and wefts 18 of each layer are disposed at an angle A of 90° with each other yet with such warps and wefts being disposed at an angle of 45° with the longitudinal axis 19 of the belt 10.

The modified belt 10 of FIG. 5 utilizes two woven fabric layers 13 in the form of a so-called stress-relieved fabric wherein the warps and wefts are disposed at an obtuse angle to each other which in the illustration of FIG. 5 is shown at an angle A of roughly 155°. Further the warps 17 and wefts 18 in each layer are disposed so that the 155° angle A is, in essence, bisected by imaginary lines parallel to the longitudinal axis 19 of the belt 10.

Although an angle of 155° is shown for the stress-relieved fabric of layers 13, it is well known in the art to provide such stress-relieved fabric having an angle A between its warps and wefts which ranges between 95° and 155°. Accordingly, although the illustration of FIG.

5 shows a 155° angle it will be appreciated that the fabric may have its warps and wefts disposed at any angle between 95° and 155°.

In the modification of the belt 10 of FIG. 6, the fabric layers 13 instead of being woven layers may be in the form of knitted layers having threads arranged in the customary knitted pattern as illustrated at 37; and, it will be appreciated that the knitted layers 13 may be layers of ordinary knitted fabric or may be a so-called non-run type knitted fabric.

Figure 8:
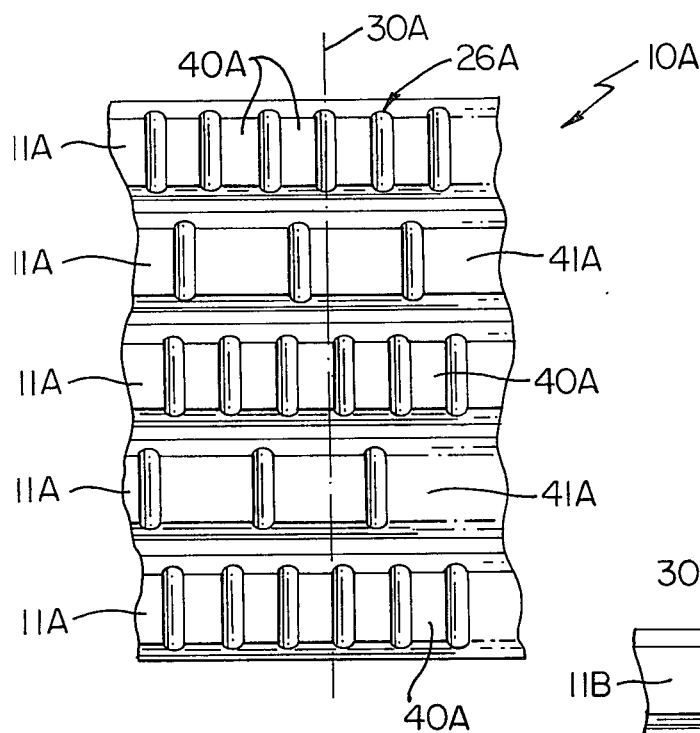
FIG. 8 is a view similar to FIG. 2 illustrating another exemplary embodiment of the belt of this invention wherein each belt element thereof has equal size teeth therein yet the teeth of one belt element are different in size from the teeth of an immediately adjacent belt element.
Figure 9:
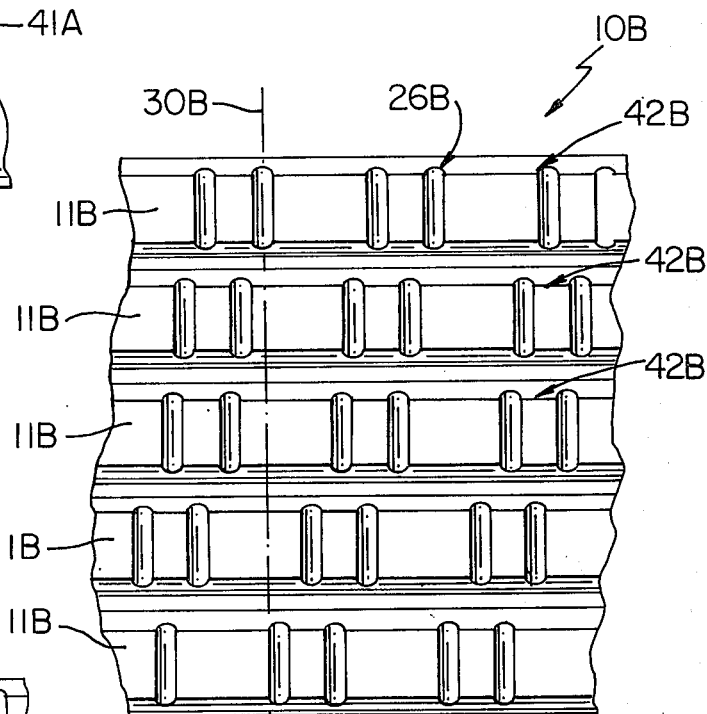
FIG. 9 is a view similar to FIG. 2 illustrating another exemplary embodiment of the belt of this invention wherein each belt element has teeth of a plurality of sizes provided in the same repeating pattern along each belt element.
Figure 10:
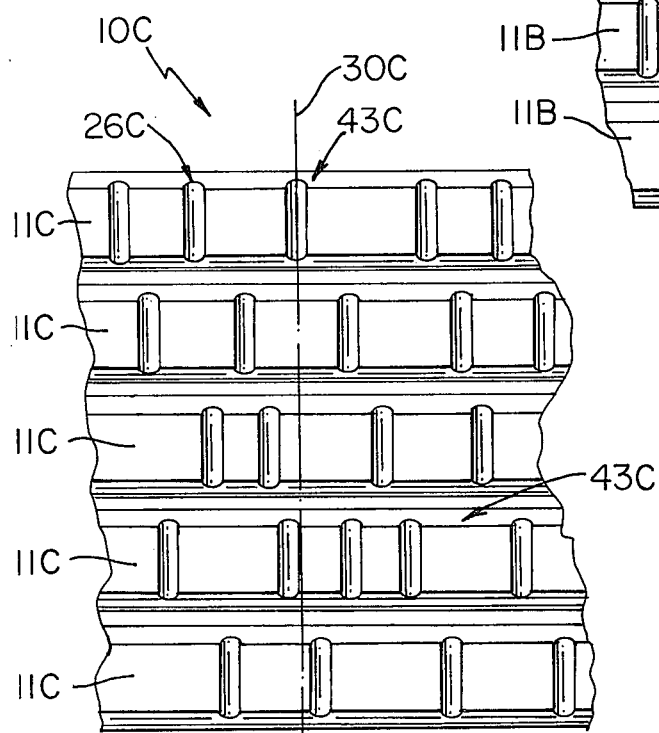
FIG. 10 is a view similar to FIG. 2 illustrating another exemplary embodiment of the belt of this invention wherein each belt element has teeth of a plurality of sizes provided in a random pattern in each belt element.

Other exemplary embodiments of the belt of this invention are illustrated in FIGS. 8, 9, and 10. The belts illustrated in FIGS. 8, 9, and 10 are very similar to the belt 10; therefore, such belts will be designated by the reference numerals 10A, 10B, and 10C respectively and representative parts of each belt which are similar to corresponding parts of the belt 10 will be designated in the drawings by the same reference numerals as in the belt 10 (whether or not such parts are mentioned in the specification) followed by an associated letter designation of either A, B, or C and not described again in detail. Only those component parts of each belt which are different from corresponding parts of the belt 10 will be designated by a new reference numeral also followed by the associated letter designation and described in detail.

The belt 10A of FIG. 8 instead of having teeth 23A in all elements 11A of equal size has equal size teeth in each element 11A yet the teeth of one belt element 11A are different in size from the size of the teeth of an immediately adjacent belt element 11A. In particular, it will be seen in FIG. 8 that the equal size teeth 40A of the uppermost belt element 11A are smaller than the equal size teeth 41A in the next element 11A. In traversing the belt 10A from top to bottom, as viewed in FIG. 8, it will be seen that the respective five belt elements 11A have small teeth 40A, large teeth 41A, small teeth 40A, large teeth 41A, and small teeth 40A in the fifth element.

The belt 10B illustrated in FIG. 9 also has a plurality of belt elements 11B and each belt element 11B has teeth of a plurality of sizes (two in this example) provided in the same repeating pattern along the length of each belt element 11B and as illustrated at a plurality of typical locations 42B.

The belt 10C of FIG. 10 has a plurality of belt elements 11C and each belt element 11C has teeth of a plurality of sizes provided therein in a random pattern and as illustrated at a plurality of typical locations 43C.

The belts 10, 10A, 10B, and 10C have several common features and one feature is that the grooves 26, 26A, 26B, and 26C in the compression section of each respective belt are of the same size. Further, it will be seen that across the width of each entire belt 10, 10A, 10B, and 10C, the teeth in each belt element are staggered relative to the teeth of an immediately adjacent belt element whereby the grooves are similarly staggered. To highlight this point, the dot-dash lines 30, 30A, 30B, and 30C should be noted in their respective FIGS. With this construction, the teeth provide optimum flexibility characterized by a substantially uniform bending modulus which is controlled by the size, construction, and arrangement of the teeth regardless of whether it is in the belt 10, 10A, 10B, or 10C. Further, the staggered relation of the teeth assures that the grooves in the belt elements are not in alignment across the entire transverse dimension of the belt thereby assuring each belt is free of hinge points. In addition, this staggered relation eliminates the reduced thickness hinge points and also assures quieter operation of each belt 10, 10A, 10B, and 10C in the associated sheaves.

Each of the belts 10, 10A, 10B, or 10C may be modified by providing one or more fabric layers in the tie band thereof. Each fabric layer may be of the type shown in the belt 10 or each fabric layer may be a bias woven fabric as shown in FIG. 4, stress-relieved fabric as shown in FIG. 5, or knitted fabric as shown in FIG. 6.

Figure 7:
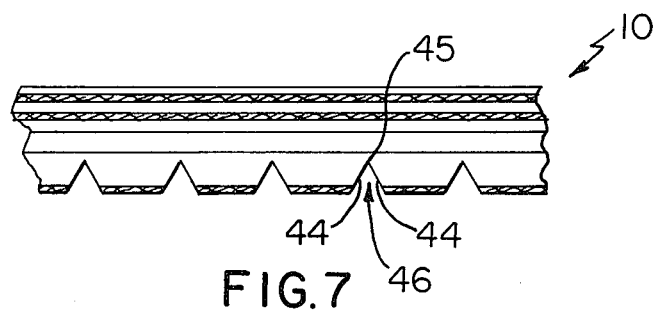
FIG. 7 is a side view of a modified version of the belt of FIG. 1 wherein the grooves in the compression section of each element instead of being roughly U-shaped are in the form of V-shaped grooves.

The belts 10, 10A, 10B, or 10C and all modifications in the tie bands of these belts may be provided with their respective U-shaped grooves 26, 26A, 26B, or 26C; however, such belts may be provided with grooves essentially as shown in FIG. 7 wherein each groove has a pair of flat sides each designated by the same reference numeral 44 diverging from a common junction line 45 to define a substantially V-shaped groove whereby such V-shaped groove is designated by the reference numeral 46.

Each of the grooves whether of V-shaped configuration as shown in FIG. 7 or of U-shaped configuration as shown in FIG. 1 may be made utilizing any suitable technique known in the art. For example, the grooves in a particular belt may be defined using a suitable mold device which has the desired tooth form. Similarly, each groove may be notched or machined in each belt element by a suitable tool and the machining action may be achieved by a suitable cutting tool, knife, or grinding device. The grinding device may be a suitable grinding wheel having the inverse of the desired tooth form.

The belts 10A, 10B, and 10C may be provided with a fabric layer or cover on the crest of their teeth in a similar manner as the cover 31 on the crest of the teeth 23 of FIG. 1.

Each of the belts 10, 10A, 10B, or 10C and all modifications of these belts may be provided with belt elements that are wrapped or covered with a cover of fabric or other suitable material on the non-parallel sides of the trapezoidal cross-sectional configuration, for example. The grooves of such wrapped belts may also be suitably covered.

It will be appreciated that the grooves in each compression section of each belt element whether V-shaped or U-shaped may be fully covered by a fabric or other suitable material instead of being raw-edged and free of covers and the covering of the grooves may be achieved utilizing any technique known in the art.

In this disclosure of the invention, the belt 10 is shown as having a plurality of five elements 11; however, it will be appreciated that any desired plurality of belt elements may be utilized in accordance with the teachings of this invention.

The belts of this invention are illustrated in the drawings as being made of rubber; however, it will be appreciated that such belts may be made of any suitable elastomeric material including all types of synthetic plastic materials used in the art of making endless power transmission belts.

The load-carrying section 21 of each belt element 11 may be made of any suitable material and using any suitable technique known in the art. Preferably each load-carrying section is made of a helically wound load-carrying cord 37 having individual turns thereof arranged in substantially equally spaced relation across each belt element. Further, each helically wound cord 37 may be made of any suitable material utilized in the art of making endless power transmission belts.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt for operation in an endless path comprising a plurality of laterally spaced belt elements and a tie band interconnecting said belt elements, each of said elements comprising, a tension section, a load-carrying section, and a compression section, each of said elements having a plurality of teeth defined in its compression section, said teeth in each belt element being staggered relative to teeth of an immediately adjacent belt element, said teeth providing optimum flexibility for said belt characterized by a substantially uniform bending modulus, said staggered relation of the teeth assuring the belt is free of hinge points and also assuring quieter operation thereof in associated sheaves.

2. A belt as set forth in claim 1 in which said teeth are defined by a plurality of grooves in each compression section extending transverse said endless path.

3. A belt as set forth in claim 2 in which said teeth are of substantially equal size and the grooves in one element are offset from the grooves of an adjacent element within the range of ¼ to ¾ of the pitch of the teeth in each element.

4. A belt as set forth in claim 3 in which each of said elements has a substantially trapezoidal cross-sectional configuration defined by non-parallel sides and said tie band binds said elements together by bonding each element adjacent the tension section thereof.

5. A belt as set forth in claim 4 and further comprising a fabric layer defining the crest of each tooth.

6. A belt as set forth in claim 2 in which each of said grooves is free of a cover and is thus raw edged.

7. A belt as set forth in claim 6 in which each of said grooves has a pair of flat sides diverging from a common junction line in a substantially V-shaped pattern.

8. A belt as set forth in claim 1 in which said teeth are defined by a plurality of grooves in each compression section extending transverse said endless path and said tie band is comprised of at least one fabric layer.

9. A belt as set forth in claim 8 in which said one fabric layer is a woven fabric layer having warps disposed perpendicular to said endless path and wefts disposed parallel thereto.

10. A belt as set forth in claim 8 in which said one fabric layer is a bias cut woven fabric layer having warps and wefts disposed at 90° with each other, said warps and wefts being disposed at an angle of 45° with the longitudinal axis of the endless belt.

11. A belt as set forth in claim 8 in which said one fabric layer is in the form of a stress-relieved fabric layer having warps and wefts which are disposed at an obtuse angle to each other ranging between 95° and 155°.

12. A belt as set forth in claim 8 in which said one fabric layer is a knitted fabric layer.

13. An elastomeric endless power transmission belt for operation in an endless path and made primarily of an elastomeric material with the belt comprising a plurality of laterally spaced belt elements and a tie band interconnecting said belt elements, each of said elements comprising a tension section, a load-carrying section, and a compression section, each of said elements having a plurality of teeth defined in its comression section by a plurality of machined grooves in each comression section extending transverse the endless path of said belt, said teeth in each belt element being staggered relative to the teeth of an immediately adjacent belt element, said teeth providing optimum flexibility for said belt characterized by a substantially uniform bending modulus, said staggered relation of the teeth assuring the belt is free of hinge points of substantially reduced thickness and also assuring quieter operation thereof in associated sheaves.

14. A belt as set forth in claim 13 in which said teeth are of substantially equal size and the grooves in one element are offset from the grooves of an adjacent element within the range of one-fourth to three-fourths of the pitch of the teeth in each element.

15. A belt as set forth in claim 13 in which each of said elements has a substantially trapezoidal cross-sectional configuration, said non-parallel sides are free of covers, and said tie band binds said elements together by binding each element adjacent the tension section thereof.

16. A belt as set forth in claim 13 in which each of said load-carrying sections in each element is defined by a helically wound load-carrying cord.

17. A method of making an elastomeric endless power transmission belt for operation in an endless path and made primarily of an elastomeric material comprising the steps of; building a plurality of laterally spaced belt elements with each element having a tension section, a load-carrying section, and a compression section; interconnecting said elements together with a tie band; and forming a plurality of teeth in the compression section of each belt element by forming grooves therein so that said teeth in each belt element are staggered relative to the teeth of an immediately adjacent belt element; said teeth providing optimum flexibility for said belt characterized by a substantially uniform bending modulus with said staggered relation of the teeth assuring the belt is free of hinge points of substantially reduced thickness and also assuring quieter operation thereof in associated sheaves.

18. A method as set forth in claim 17 in which said forming step comprises notching each belt element to define said teeth.

19. A method as set forth in claim 18 in which said notching step comprises grinding said grooves in each belt element.

20. A method as set forth in claim 17 in which said forming step comprises molding said grooves in each belt element.

* * * * *